(12) United States Patent
Jansen (10) Patent No.: US 7,944,250 B2
(45) Date of Patent: May 17, 2011

(54) CIRCUIT ARRANGEMENT FOR PROVIDING A VOLTAGE SUPPLY FOR A TRANSISTOR DRIVER CIRCUIT

(75) Inventor: Uwe Jansen, Werl (DE)

(73) Assignee: Infineon Technologies AG, Neubiberg (DE)

( * ) Notice: Subject to any disclaimer, the term of this patent is extended or adjusted under 35 U.S.C. 154(b) by 126 days.

(21) Appl. No.: 12/334,999

(22) Filed: Dec. 15, 2008

(65) Prior Publication Data

US 2009/0160534 A1 Jun. 25, 2009

(51) Int. Cl.
*H03B 1/00* (2006.01)
(52) U.S. Cl. ........................................ 327/108; 327/536
(58) Field of Classification Search .......................... None
See application file for complete search history.

(56) References Cited

U.S. PATENT DOCUMENTS

| | | | |
|---|---|---|---|
| 5,365,118 A | 11/1994 | Wilcox | |
| 6,242,970 B1 * | 6/2001 | Grant et al. | 327/536 |
| 6,636,103 B2 * | 10/2003 | Wurcer et al. | 327/536 |
| 6,650,100 B1 * | 11/2003 | Kohout et al. | 323/282 |
| 6,700,419 B1 * | 3/2004 | Fan et al. | 327/108 |
| 6,801,063 B1 * | 10/2004 | Guo | 327/108 |
| 6,812,782 B2 * | 11/2004 | Grant | 327/589 |
| 7,046,050 B1 | 5/2006 | Schottler | |
| 7,408,307 B2 * | 8/2008 | Ribarich | 315/291 |
| 7,466,170 B2 * | 12/2008 | Balakrishnan | 327/112 |
| 7,688,052 B2 * | 3/2010 | Rozsypal et al. | 323/282 |
| 2006/0119414 A1 * | 6/2006 | Gotou et al. | 327/427 |
| 2007/0103001 A1 * | 5/2007 | Chiozzi et al. | 307/10.1 |
| 2007/0279107 A1 * | 12/2007 | Nuebling et al. | 327/110 |
| 2009/0121702 A1 * | 5/2009 | Li et al. | 323/351 |

FOREIGN PATENT DOCUMENTS

WO 2005/027327 A1 3/2005

* cited by examiner

*Primary Examiner* — Thomas J Hiltunen
(74) *Attorney, Agent, or Firm* — Coats & Bennett, P.L.L.C.

(57) ABSTRACT

The invention relates to a circuit arrangement for providing a voltage supply for a driver circuit for driving a semiconductor switch. The circuit arrangement has: a first bootstrap circuit which is supplied with a first auxiliary voltage referring to a lower supply potential, the bootstrap circuit comprising a first capacitor which provides a supply voltage for the driver circuit; a first charge pump which is designed to keep the charge in the first capacitor at or above a particular level at least during a particular period of time; a second bootstrap circuit which is supplied with a second auxiliary voltage referring to an upper supply potential, the bootstrap circuit comprising a second capacitor which provides a supply voltage for the first charge pump; and a second charge pump which is designed to generate the second auxiliary voltage.

14 Claims, 6 Drawing Sheets

CIRCUIT ARRANGEMENT FOR PROVIDING A VOLTAGE SUPPLY FOR A TRANSISTOR DRIVER CIRCUIT

CROSS REFERENCE TO RELATED APPLICATIONS

Pursuant to 35 U.S.C. §119(a), this application claims the benefit of German Patent Application No. 10 2007 061 978.4-32 (DE) filed on Dec. 21, 2007, the contents of which are herein incorporated by reference in their entirety.

TECHNICAL FIELD

The present invention relates to a circuit arrangement for providing a voltage supply for a transistor driver circuit, in particular the voltage supply for driver circuits for IGBT or MOSFET half-bridges which are used, for example, in intelligent power semiconductor modules.

BACKGROUND

Semiconductor switches, in particular power transistors for switching large currents and voltages, often require special driver circuits for generating the control signals which control the switching-on and switching-off of the power transistors. Power transistors are often used as semiconductor switches in transistor half-bridges which often comprise only n-type transistors (for example n-channel MOSFETs, n-channel IGBTs) in the case of power applications. The reason for this lies in the electrical properties which are better than those of p-type transistors.

Transistor half-bridges comprise a high-side transistor and a low-side transistor. In this case, the high-side transistor is connected between an upper supply potential and the output of the half-bridge, and the low-side transistor is connected between the output of the half-bridge and a lower supply potential. High-side transistors require control signals which are not based on a constant reference potential, for example the ground potential, but rather on the output of the half-bridge which is generally connected to the emitter or source of the high-side transistor. The same applies to p-type low-side transistors. The need for floating control signals makes it difficult to supply voltage to driver circuits for high-side transistors. This is the case, in particular, when the power semiconductor transistors have to take up reverse voltages of several hundred volts but the driver circuit itself is not supposed to have any high-voltage-resistant semiconductor components or is intended to have as few high-voltage-resistant semiconductor components as possible for reasons of space and on account of the production technology.

Different possibilities for supplying driver circuits for high-side transistors in a floating manner are known. One of them is to use a bootstrap circuit. A bootstrap circuit is understood as meaning a combination of a diode and a capacitor, the driver circuit being supplied either from the capacitor or directly from an auxiliary voltage source via the diode. In the latter case, the capacitor is also charged from the auxiliary voltage source via the diode. The charge stored in the capacitor is then supplied to the driver circuit again depending on the switching state of the transistor. Specially clocked transistors may also be used instead of diodes.

Another possibility is to use a self-clocked charge pump. A charge pump is understood as meaning an arrangement which comprises a clock generator, switches and capacitors and allows a capacitor to be charged at a voltage source, to then be disconnected from this source and to be discharged into a load. In this case, the switches may be transistors or diodes, transistors having to be used at at least one point. In the text below, a charge pump is always understood as meaning a self-clocked charge pump whose clock is independent of the drive signal for the power transistors.

The sole use of a bootstrap circuit for supplying the driver circuit for a high-side power transistor often does not suffice since capacitors of an appropriate size are often not able to store sufficient charge to be able to maintain the supply for the driver circuit for a sufficient amount of time. It is often not possible to increase the size of the capacitor for reasons of space. For this purpose, the bootstrap circuit may be supplemented with a charge pump which keeps the capacitor, which is charged by the diode of the bootstrap circuit, in a charged state. In this case, the charge pump may be dimensioned in such a manner that only the charge which has flowed away through the driver circuit during a clock cycle (of the charge pump) is replaced again by the charge pump. However, the clock generator of such a charge pump likewise requires a floating voltage supply. In a simple case, the voltage supply for the clock generator can be directly derived from the upper supply potential with the aid of a series circuit comprising a resistor and a zener diode. However, this presupposes a high-voltage-resistant resistor, which may be undesirable for reasons of production technology. In addition, a considerable power loss is consumed in the resistor. If the supply current of the driver exceeds an order of magnitude of 1 mA, for example, such a solution is unattractive despite its simplicity.

There is a general need to provide a circuit arrangement for providing a supply voltage for a transistor driver circuit, which manages, as far as possible, without high-voltage-resistant semiconductor components, in which the power loss consumed is as low as possible and which is able to supply the driver circuit without time limitations.

SUMMARY

According to one exemplary embodiment of the invention, the circuit arrangement for providing a voltage supply for a driver circuit for driving a semiconductor switch comprises a first bootstrap circuit which is supplied with a first auxiliary voltage referring to a lower supply potential. The first bootstrap circuit comprises a first capacitor which provides a supply voltage for the driver circuit, and a first charge pump which is designed to keep the charge in the capacitor at or above a particular level at least during a particular period of time. The circuit arrangement further comprises a second bootstrap circuit which is supplied with a second auxiliary voltage referring to an upper supply potential. The second bootstrap circuit comprises a second capacitor which provides a supply voltage for the first charge pump, and a second charge pump which is designed to generate the second auxiliary voltage.

BRIEF DESCRIPTION OF THE DRAWINGS

The present invention can be better understood with reference to the following drawings and the description. The components in the figures are not necessarily to scale, emphasis instead being placed upon illustrating the principles of the invention. Moreover, in the figures, like reference numerals designate corresponding parts throughout the different views.

FIG. 1c shows a simplified circuit diagram of the charge pump from FIG. 1a.

FIG. 3b shows a simplified circuit diagram of the charge pump from FIG. 3a.

FIG. 4b shows a simplified illustration of the driver circuit from FIG. 4a.

DETAILED DESCRIPTION

One exemplary circuit arrangement for providing a voltage supply for a driver circuit for driving a semiconductor switch $M_1$ comprises a first bootstrap circuit which is supplied with a first auxiliary voltage referring to a lower supply potential. The first bootstrap circuit comprises a first capacitor which provides a supply voltage for the driver circuit, and a first charge pump which is designed to keep the charge in the capacitor at or above a particular level at least during a particular period of time.

The circuit arrangement may also have a second bootstrap circuit which is supplied with a second auxiliary voltage referring to an upper supply potential. The second bootstrap circuit comprises a second capacitor which provides a supply voltage for the first charge pump, and a second charge pump which is designed to generate the second auxiliary voltage.

A further example of the circuit arrangement comprises a first circuit node for supplying the lower supply potential, a second circuit node for supplying the upper supply potential, a third circuit node for supplying the first auxiliary voltage based on the lower supply potential, and a fourth circuit node for providing the auxiliary voltage based on the upper supply potential. In this case, the second charge pump is connected to all four circuit nodes and is designed to generate the second auxiliary voltage from the first auxiliary voltage.

The circuit arrangement may also have a fifth circuit node for connection to an output connection (for example source connection or emitter connection) of the transistor to be driven by the transistor driver. In this case, the fifth circuit node is connected to the third circuit node by means of a series circuit comprising the first capacitor and the first diode. In this case, the first capacitor and the first diode form the first bootstrap circuit. The fifth circuit node may also be connected to the fourth circuit node by means of a series circuit comprising the second capacitor and the second diode. The second capacitor and the second diode form the second bootstrap circuit in this case.

The first charge pump may be designed to transfer charge from the second capacitor to the first capacitor. The first capacitor thus provides the supply voltage for the driver circuit. Depending on whether the driver circuit is supplied in a unipolar or bipolar manner, the first charge pump is designed for unidirectional or bidirectional operation.

Figure 1A:
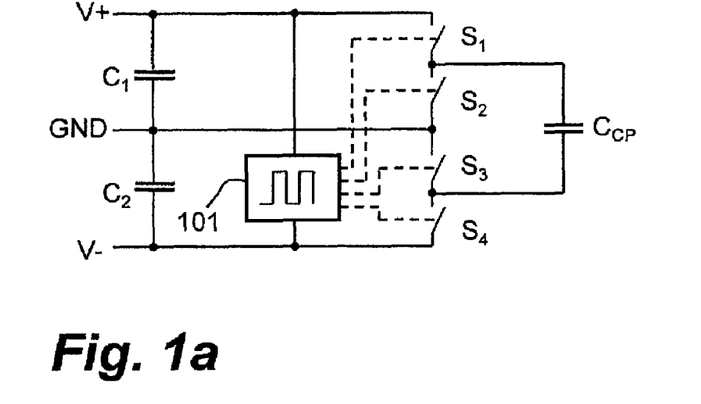
FIG. 1a shows, by way of example, a circuit diagram of a charge pump having 4 switches.

FIG. 1a shows an example of a charge pump having a first capacitor $C_1$, a second capacitor $C_2$, a clock generator 101, a pump capacitor $C_{CP}$ and four controlled switches $S_1$, $S_2$, $S_3$ and $S_4$ for switching the pump capacitor. The four switches $S_1$ to $S_4$ each have a control connection which is connected to the clock generator 101, the clock generator 101 generating the control signals for the controlled switches $S_1$ to $S_4$. The circuit has a reference circuit node which is supplied with a reference potential, for example a ground potential GND. A first voltage V+ which is positive with respect to the reference potential is applied to a first circuit node, this first voltage being buffered by the first capacitor $C_1$. The first capacitor is therefore connected between the first circuit node and the reference circuit node. A second voltage V− which is negative with respect to the reference potential GND is provided at a second circuit node. This voltage is buffered by the second capacitor $C_2$ which is connected between the reference circuit node and the second circuit node.

A series circuit comprising the first switch $S_1$ and the second switch $S_2$ is located between the first circuit node and the reference circuit node, and a series circuit comprising the third switch $S_3$ and the fourth switch $S_4$ is located between the reference circuit node and the second circuit node. The pump capacitor $C_{CP}$ connects the common circuit node of the switches $S_1$ and $S_2$ to the common circuit node of the switches $S_3$ and $S_4$. The switch $S_1$ may connect a first connection of the pump capacitor $C_{CP}$ to the first circuit node, and the switch $S_2$ may connect the first connection of the pump capacitor $C_{CP}$ to the reference circuit node. The switch $S_3$ may connect a second connection of the pump capacitor $C_{CP}$ to the reference circuit node, and the switch $S_4$ may connect the second connection of the pump capacitor $C_{CP}$ to the second circuit node. The switches are driven by the clock generator 101 in such a manner that the pump capacitor $C_{CP}$ is located either between the reference circuit node and the first circuit node or between the second circuit node and the reference circuit node.

Assuming that a first voltage V+ which is positive with respect to the reference potential GND is applied to the first circuit node and the pump capacitor $C_{CP}$ is connected, by the clock generator 101, between the first circuit node and the reference circuit node, the capacitor $C_{CP}$ can be charged until it reaches the first voltage V+ at most. If the pump capacitor is then changed over, it is located between the reference circuit node and the second circuit node, and the charge of the pump capacitor $C_{CP}$ is transferred to the second capacitor $C_2$. This second capacitor $C_2$ then provides the second voltage V− which is negative with respect to the reference potential GND. If the pump capacitor $C_{CP}$ is regularly changed over between the two states described, the magnitude of the second voltage V− may, at most, assume the same value as the first voltage V+.

In the above description of the function of the charge pump from FIG. 1, a flow of energy from the input voltage circuit with a positive input voltage V+ to the output voltage circuit with a negative output voltage V− was assumed. However, it is obvious that a flow of energy may also take place in the reverse direction.

Figure 1B:
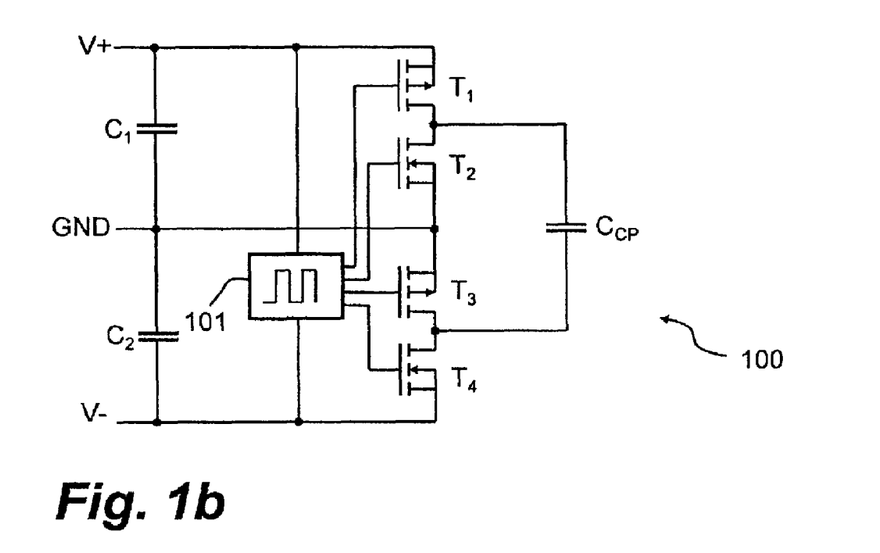
FIG. 1b shows, by way of example, a circuit diagram of a charge pump, transistors being used to switch the pump capacitor.

The switches $S_1$ to $S_4$ may, for example, be in the form of MOSFETs $T_1$ to $T_4$, as illustrated in FIG. 1b, for example. However, the structure and function of the circuit illustrated in FIG. 1b are identical to those of the circuit from FIG. 1a.

Figure 1C:
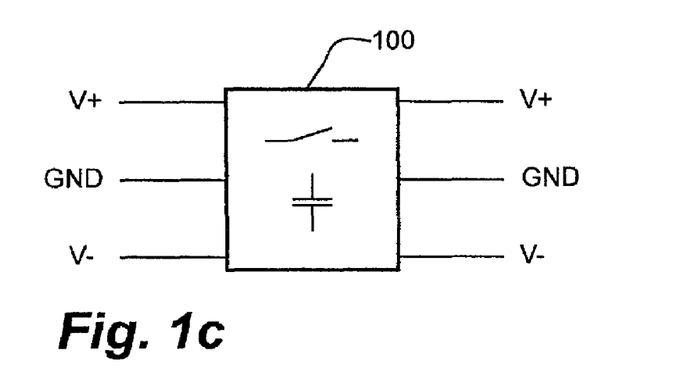

FIG. 1c shows a simplified circuit diagram of the charge pumps from FIGS. 1a and 1b. The designation GND for the reference potential of the reference circuit node need not necessarily be a constant (ground) potential but rather may be connected to any desired—even floating—circuit node. The first and second voltages V+ and V− then relate to the potential of this circuit node. Furthermore, the charge pump 100 need not necessarily be supplied by the first voltage V+ and the second voltage V−, as illustrated in FIGS. 1a and 1b. The charge pump 100 performs its function as long as only the oscillation of the clock generator 101 and thus the switching of the switches $S_1$ to $S_4$ or $T_1$ to $T_4$ are ensured.

Figure 2:
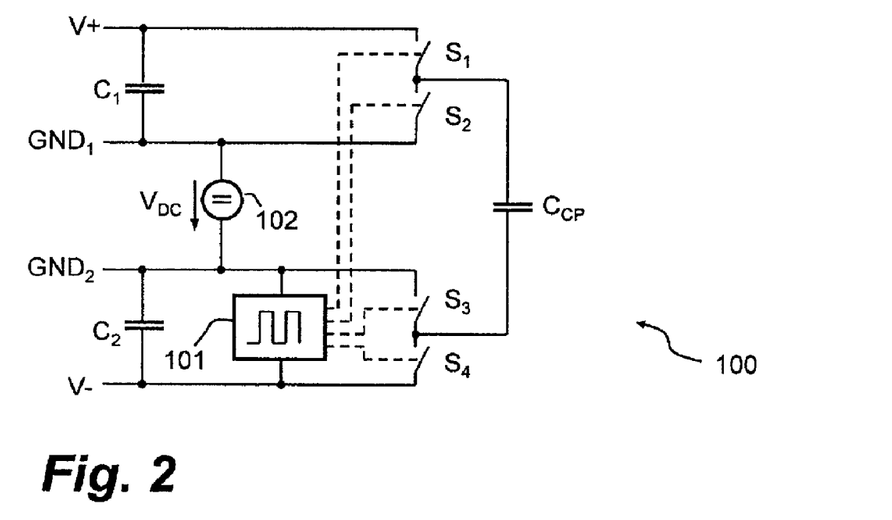
FIG. 2 shows a charge pump in which a DC voltage is superposed between the input voltage circuit and the output voltage circuit.

FIG. 2 shows a further variant of the charge pump from FIG. 1a. The charge pump 100 from FIG. 2 is largely identical to that from FIG. 1a but there are two reference circuit nodes $GND_1$ and $GND_2$. The first capacitor $C_1$ (with a positive first voltage V+) is connected between the first circuit node and the first reference circuit node $GND_1$, and the second capacitor $C_2$ (with a negative second voltage V−) is connected between the second reference circuit node $GND_2$ and the second circuit node. The first voltage V+ is based on the first reference potential $GND_1$ of the reference circuit node. The second (negative) voltage V− is based on a second reference potential $GND_2$ of the second reference circuit node. The potential difference between the first reference potential $GND_1$ and the second reference potential $GND_2$ is denoted $V_{DC}$ and is symbolized by the voltage source 102. The first circuit node and the first reference circuit node are connected by means of a series circuit comprising the switches $S_1$ and $S_2$, and the second reference circuit node and the second circuit node are connected by means of a series circuit comprising the switches $S_3$ and $S_4$. The common node of the switches $S_1$ and $S_2$ is connected to a first connection of the pump capacitor $C_{CP}$, and the common node of the switches $S_3$ and $S_4$ is connected to a second connection of the pump capacitor $C_{CP}$.

The function of the circuit from FIG. 2 is identical to that from FIG. 1a. A charge applied to the first capacitor $C_1$ by means of the first voltage V+ is transferred to the second capacitor $C_2$ by the pump capacitor $C_{CP}$. This is carried out in the same manner as that in the charge pump from FIG. 1a. If a first voltage V+ is applied to the first circuit node, a second voltage V− is provided by the charge pump at the second circuit node. In a similar manner to FIG. 1a, the charge pump 100 also functions in the reverse direction.

Figure 3A:
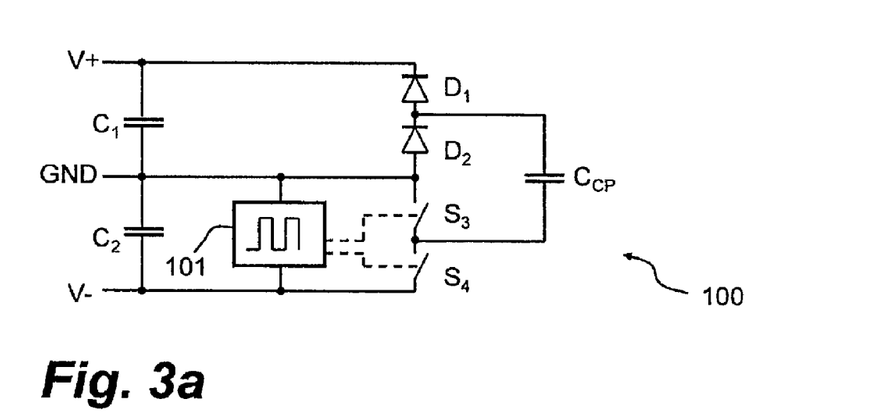
FIG. 3a shows a unidirectional charge pump which has a similar structure to the charge pump from figure 1a but in which the switches in the output voltage circuit are implemented using diodes.
Figure 3B:
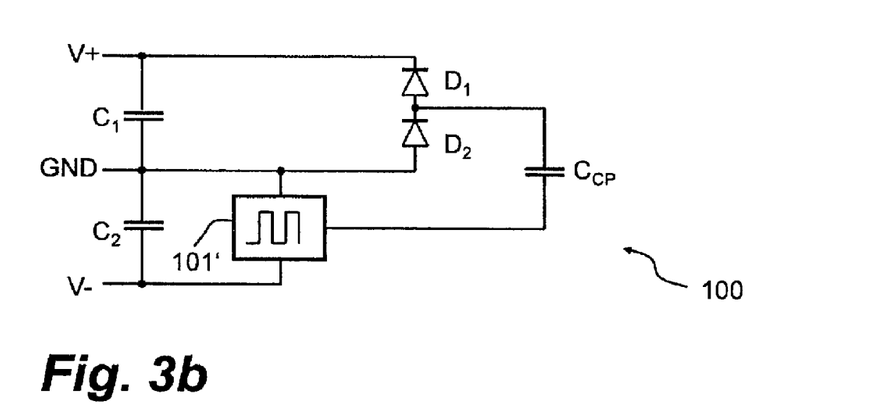

The charge pump 100 illustrated in FIG. 3a essentially corresponds to the charge pump from figure 1a, the switch $S_1$ and the switch $S_2$ being implemented using diodes $D_1$ and $D_2$. The method of operation of the circuit illustrated in FIG. 3a corresponds to that of the circuit from FIG. 1a but only a unidirectional flow of energy is possible from the second circuit node, which is supplied with a second voltage V−, to the first circuit node at which a first voltage V+ is provided. The circuit shown in FIG. 3b can be understood as a simplified illustration of the charge pump from FIG. 3a. The clock generator 101' of the charge pump 100 from FIG. 3b also comprises the function of the clock generator 101 and the switches $S_3$ and $S_4$ from FIG. 3a.

Figure 4A:
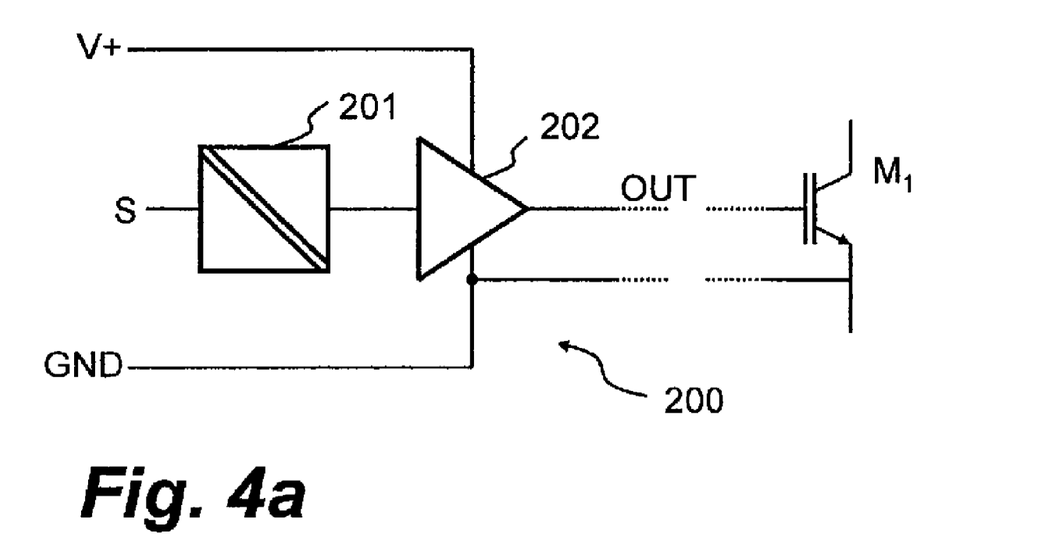
FIG. 4a shows a driver circuit for driving a transistor with a level shifter and a driver.

FIG. 4a shows, by way of example, a driver circuit 200 for driving a power transistor. An n-channel IGBT $M_1$ is illustrated in the present example. The switching state of the transistor $M_1$ is determined by the control signal S which is supplied to a level shifter 201, transformer, optocoupler or another potential-isolating component. The output signal from the level shifter is supplied to the driver 202. The driver 202 then provides the actual driver signal OUT which is supplied to the control connection of the transistor $M_1$, the gate of the IGBT in the present case. A level shifter 201 is needed whenever the driver signal OUT is not based on a constant reference potential but rather on a floating reference potential. In this example too, the designation GND for the reference potential must not be understood in such a manner that it is necessarily a constant ground potential. A load connection (for example an emitter connection of an IGBT or a source connection of a MOSFET) of the transistor $M_1$ is typically connected to the connection for the reference potential GND. In the present case, the emitter of the IGBT is connected to the connection for the reference potential GND.

Figure 4B:
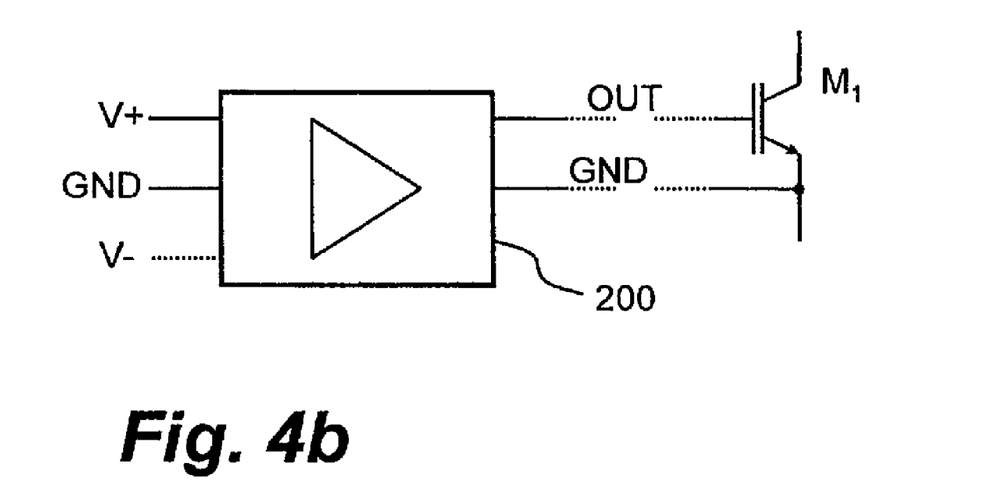

FIG. 4b shows a simplified circuit symbol for the driver 200 from FIG. 4a. In the case of this circuit symbol, the connection for the control signal S is no longer illustrated for reasons of clarity. As an alternative to the variant of unipolar supply of the driver 202, as shown in FIG. 4a, the driver 200 may also be supplied in a bipolar manner (dashed connection in FIG. 4b) if a bipolar control signal OUT is intended to be generated for the control connection of the transistor $M_1$. A bipolar control signal is understood as meaning a control signal which can assume voltage values which are positive and negative with respect to the reference potential GND.

Figure 5:
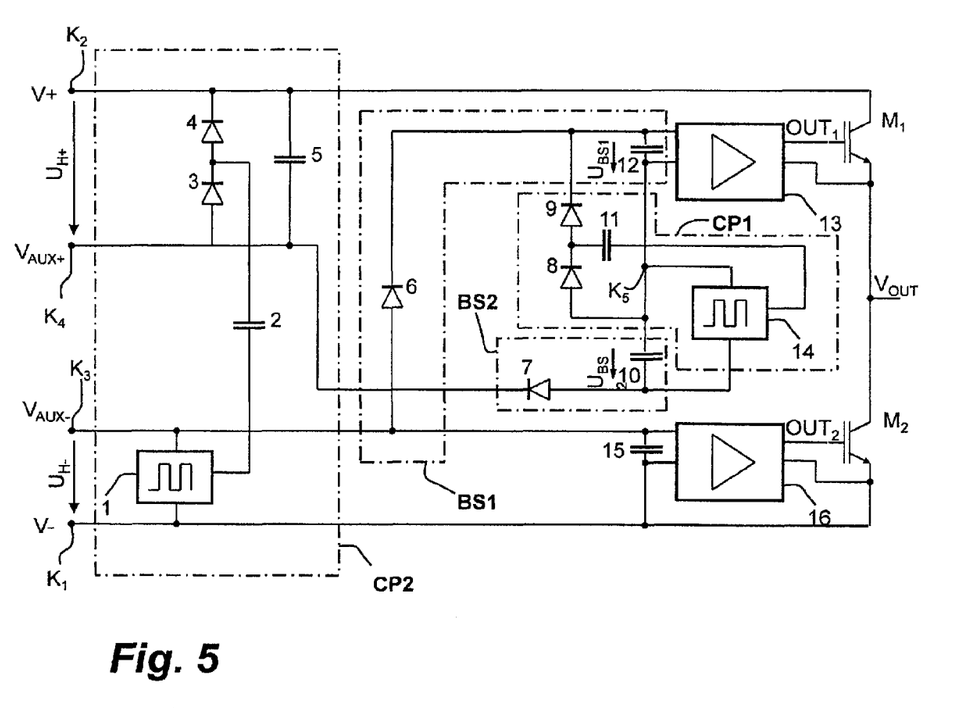
FIG. 5 shows, as a first example of the invention, a circuit arrangement for supplying transistor driver circuits with two driver circuits and two bootstrap circuits.

FIG. 5 shows, as a first example of the invention, a circuit arrangement for providing a voltage supply for a driver circuit 13 for driving a semiconductor switch $M_1$. The semiconductor switch $M_1$, an n-channel IGBT in the present example, is part of an IGBT half-bridge comprising the high-side semiconductor switch $M_1$ and a low-side semiconductor switch $M_2$. A further driver circuit 16 is provided for driving the low-side semiconductor switch. The high-side semiconductor switch $M_1$ is an n-channel IGBT, and consequently a floating voltage supply is needed to supply the driver circuit 13, the supply voltages for the driver circuit 13 being based on the output potential $V_{OUT}$ of the half-bridge, that is to say on the emitter potential of the high-side semiconductor switch $M_1$.

The circuit arrangement comprises a first circuit node $K_1$ which is supplied with a lower supply potential V−, a second circuit node $K_2$ which is supplied with an upper supply potential V+, a third circuit node $K_3$ which is supplied with a first auxiliary voltage $U_{H-}$ based on the lower supply potential V−, and a fourth circuit node $K_4$ to which a second auxiliary voltage $U_{H+}$ which is based on the upper supply potential and is generated and provided by the circuit itself is applied. The potential difference between the lower supply potential V− and the upper supply potential V+ may be several hundred volts. In contrast, the first auxiliary voltage $U_{H-}$ based on the lower supply potential V− is only around +15 V. The second auxiliary voltage $U_{H+}$ which is based on the upper supply potential V+ and is applied to the fourth circuit node $K_4$ is negative (the arrow in FIG. 5 is therefore shown from the node $K_2$ to the node $K_4$) and is in a range from 3 V to 20 V. The magnitudes of the first and second auxiliary voltages $U_{H-}$, $U_{H+}$ are typically the same. It should be noted that the second auxiliary voltage $U_{H+}$ need not be provided from the outside but rather is generated by the circuit arrangement.

In the present example, the supply voltage for the driver 13, which generates the driver signal $OUT_1$ for the high-side transistor $M_1$, is provided, on the one hand, by a first bootstrap circuit BS1 and, on the other hand, by a first charge pump CP1. In this case, the first bootstrap circuit BS1 comprises a first capacitor 12 whose capacitor voltage $U_{BS1}$ supplies the driver circuit 13 with voltage. A first connection of the first capacitor 12 is connected to a fifth circuit node $K_5$ which in turn is connected, via the driver 13, to the output connection of the half-bridge ($M_1$, $M_2$), that is to say to the emitter connection of the transistor $M_1$. The supply voltage for the driver 13 (capacitor voltage $U_{BS1}$ of the first capacitor 12) is thus based on the potential $V_{OUT}$ of the fifth circuit node $K_5$. A second connection of the first capacitor 12 is connected, on the one hand, to the driver circuit 13 and, on the other hand, to the cathode of a first diode 6 whose anode is connected to the third circuit node $K_3$. That is to say, the first capacitor 12 is charged from the first auxiliary voltage $U_{H-}$ via the first diode 6 if the potential of the fifth circuit node $K_5$ (that is to say the output potential $V_{OUT}$ of the half-bridge) has a correspondingly low value. In the present example, this is the case when the low-side transistor $M_2$ is on. The output potential $V_{OUT}$ (and thus the potential of the fifth circuit node $K_5$) then corresponds approximately to the lower supply potential V−. If the output potential $V_{OUT}$ at the output of the half-bridge rises, for example when the high-side transistor $M_1$ is on and the low-side transistor $M_2$ is off, the first diode 6 prevents the first capacitor 12 from being discharged, and the capacitor 12 can also supply the driver circuit 13 in the state using its stored charge.

In some cases, however, the charge stored in the first capacitor 12 does not suffice to supply the driver circuit 13 with voltage for a predefined amount of time. In order to prevent a dip in the capacitor voltage $U_{BS1}$ and thus a dip in the supply voltage for the driver circuit 13, the first capacitor 12 may be recharged with the aid of a first charge pump CP1. That is to say, the first charge pump is designed to keep the charge in the first capacitor (and thus the capacitor voltage $U_{BS1}$) at or above a predefined level at least during a particular period of time and to ensure that a sufficiently high supply voltage is available for the driver circuit 13. The structure of the charge pump CP1 essentially corresponds to the structure of a charge pump illustrated in FIG. 3b.

In the example shown in FIG. 5, the charge pump CP1 is a unidirectional charge pump in which the energy is transported from an input circuit having a second capacitor 10, to which a capacitor voltage $U_{BS2}$ is applied as the input voltage, to an output circuit in which the capacitor voltage $U_{BS1}$ is provided at the first capacitor 12 as the output voltage. The reference circuit node of the charge pump from FIG. 3b corresponds to the fifth circuit node $K_5$ or the output of the half-bridge ($M_1$, $M_2$), and the reference potential GND of the charge pump from FIG. 3b corresponds to the output potential of the half-bridge $V_{OUT}$ or the potential of the fifth circuit node $K_5$. The diodes $D_1$ and $D_2$ and the pump capacitor $C_{CP}$ of the charge pump from FIG. 3b correspond to the diodes 9 and 8 and the pump capacitor 11 of the charge pump CP1 in FIG. 5. Like the clock generator 101' from FIG. 3b, the clock generator 14 of the charge pump CP1 in FIG. 5 is supplied by the voltage across the capacitor in the input circuit, that is the capacitor voltage $U_{BS2}$ across the second capacitor 10 in the present case. In the example in FIG. 5, the first capacitor 12, at which the capacitor voltage $U_{BS1}$ across the first capacitor 12 is provided as the output voltage, is used as the capacitor in the output circuit ($C_1$ in FIG. 3b). The first capacitor 12 is practically at the same time part of the first bootstrap circuit BS1 and the first charge pump CP1, in which case it is assigned only to the bootstrap circuit BS1 in the structure illustrated in FIG. 5 for the sake of clarity.

The previous explanations with respect to FIG. 5 relate to the first bootstrap circuit BS1, which provides a supply voltage for the driver circuit 13 with the aid of the first capacitor 12, and the first charge pump CP1, which is designed to keep the charge in the first capacitor 12 at or above a particular level in order to guarantee a particular level of supply voltage for the driver circuit 13 at least over a particular predefined period of time. The previous explanations did not reveal how the supply voltage of the first charge pump CP1 is provided, that is to say how the capacitor voltage $U_{BS2}$ across the second capacitor 10 is generated so that the first charge pump CP1 can operate as intended. The following text thus explains those circuit components which are needed to generate the capacitor voltage $U_{BS2}$ of the second capacitor 10, that is to say to charge the second capacitor 10, and are thus needed for operation of the first charge pump CP1.

The second capacitor 10 is not only part of the first charge pump CP1 but also forms a second bootstrap circuit BS2 together with the second diode 7. In the illustration in FIG. 5, the second capacitor 10 is again assigned only to the second bootstrap circuit BS2 for the sake of clarity. A first connection of the capacitor 10 is connected to the circuit node $K_5$ and a second connection of the capacitor 10 is connected to the anode of the diode 7. The cathode of the diode 7 is in turn connected to the fourth circuit node $K_4$. With a correspondingly high potential of the fifth circuit node $K_5$, for example when the high-side transistor $M_1$ is switched on, the second capacitor 10 is charged from the second auxiliary voltage $U_{H+}$ via the diode 7. As soon as the potential of the fifth circuit node $K_5$ falls again, for example after the low-side transistor $M_2$ has been switched on, the diode 7 is reverse-biased and the charge stored in the second capacitor 10 can be supplied to the first charge pump CP1, more precisely to the clock generator 14. The clock generator 14 is thus supplied by the capacitor voltage $U_{BS2}$ of the second capacitor 10.

A second charge pump CP2 is provided for the purpose of generating the second auxiliary voltage $U_{H+}$ which is applied to the fourth circuit node $K_4$. The function and structure of this charge pump CP2 correspond to those of the charge pump from FIG. 2, the simplified illustration of the clock generator analogous to FIG. 3b having been selected. In the second charge pump CP2, the third circuit node $K_3$ corresponds to the second reference circuit node (second reference potential $GND_2$) in FIG. 2 and the second circuit node $K_2$ corresponds to the first reference circuit node (first reference potential $GND_1$) in FIG. 2. The clock generator is supplied by the first auxiliary voltage $U_{H-}$. The diodes 3 and 4 and the pump capacitor 2 of the charge pump CP2 correspond to the switches $S_1$ and $S_2$ and the pump capacitor $C_{CP}$ in FIG. 2. The potential difference $V_{DC}$ in FIG. 2 corresponds to the difference (V+−($U_{H-}$+V−)). The capacitor 5 is connected in parallel with the series circuit comprising the diodes 3 and 4 in the output circuit of the charge pump CP2. The capacitor voltage across the capacitor 5 corresponds to the second auxiliary voltage $U_{H+}$ whose magnitude is approximately the same as that of the first auxiliary voltage $U_{H-}$. However, the potential of the fourth circuit node $K_4$ is lower than the upper supply voltage V+, that is to say the second auxiliary voltage $U_{H+}$ is negative with respect to the upper supply potential V+.

The second bootstrap circuit BS2 and the second charge pump CP2 are thus used to generate an input voltage for the first charge pump CP1 which in turn is used to maintain the voltage supply for the driver circuit 13. A further driver circuit 16 which is directly connected to the first and third circuit nodes $K_1$ and $K_3$ is connected upstream of the low-side transistor $M_2$. The driver circuit 16 is thus directly supplied by the first auxiliary voltage $U_{H-}$. This auxiliary voltage is also buffered by a capacitor 15 which is connected between the first and third circuit nodes $K_1$ and $K_3$.

It should be noted that the circuit arrangement does not require any high-voltage-resistant semiconductor components, apart from the bootstrap diodes. The only further component which has to be resistant to high voltage is the pump capacitor 2 of the second charge pump CP2. In this context, resistant to high voltage means that the component must be designed for a voltage corresponding to the potential difference V+−V− between the upper supply potential V+ and the lower supply potential V−. Furthermore, there are no relatively large loads in the circuit arrangement. Electrical power loss is produced only at the times at which the clock generators 1 and 14 of the charge pumps CP2 and CP1 are changed over. However, this power loss is negligible in comparison with the power loss generated in the voltage supply which was mentioned initially and comprises a zener diode with a series resistor.

Figure 6:
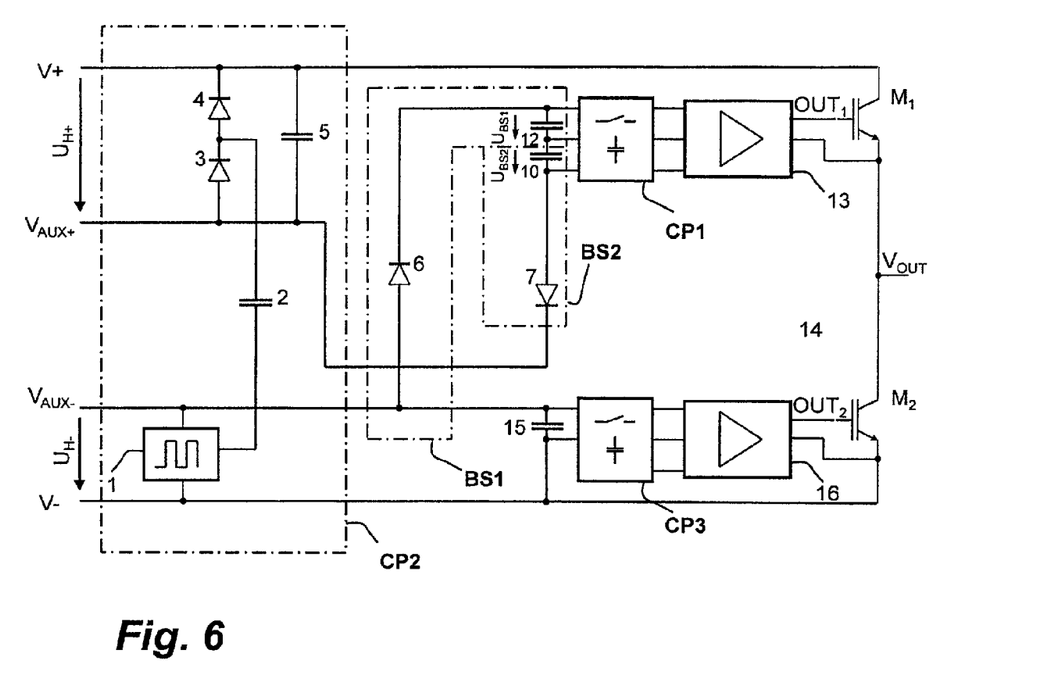
FIG. 6 shows another example of the invention, the transistors being able to be driven using bipolar signals.

Large parts of the example of the invention, which is illustrated in FIG. 6, are identical to the example shown in FIG. 5. The charge pump CP1 is now represented by the simplified equivalent circuit diagram from FIG. 1c. In contrast to the example shown in FIG. 5, this is a bidirectional charge pump, as illustrated, for example, in FIG. 1a or 1b. This makes it possible to supply the driver circuit 13 in a bipolar manner. Consequently, the driver circuit 13 is able to generate bipolar driver signals $OUT_1$ for the high-side transistor $M_1$. That is to say, the driver signal $OUT_1$ may provide positive and negative values (based on the potential of the reference node of the driver circuit). In this case, a third charge pump CP3 which is supplied with the first auxiliary voltage $U_{H-}$ in the input circuit as the input voltage and uses it to generate a bipolar voltage supply for the driver circuit 16 is also connected upstream of the driver 16 for the low-side transistor $M_2$. The third charge pump CP3 may again be a unidirectional charge pump (cf., for example, FIG. 3a).

Figure 7:
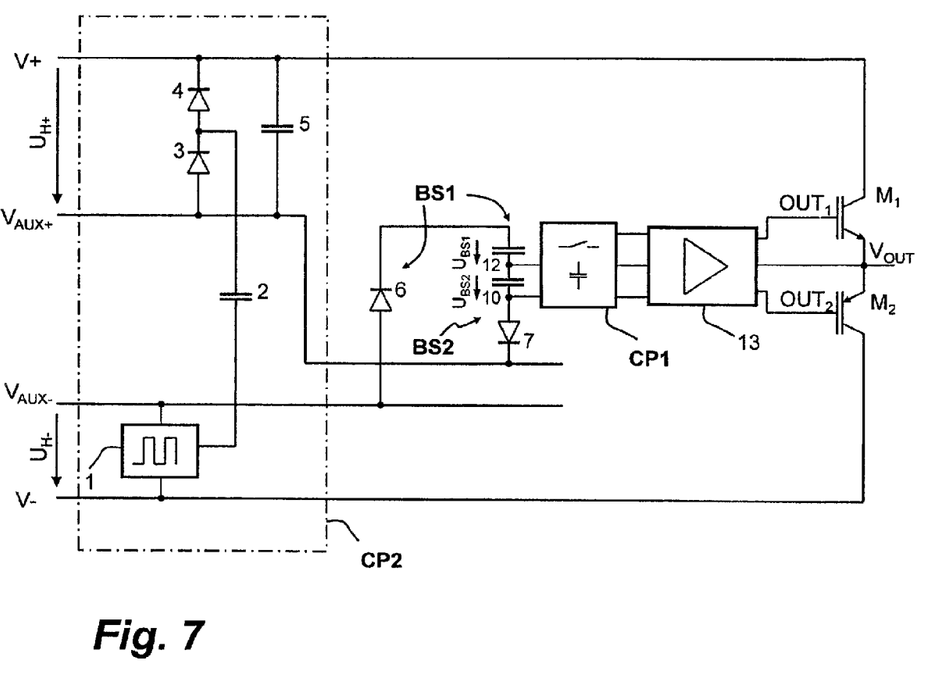
FIG. 7 shows, as another example of the invention, a circuit arrangement for supplying transistor driver circuits for a transistor half-bridge constructed from two complementary transistors.

As a further example of the invention, the circuit arrangement illustrated in FIG. 7 largely corresponds to the circuit arrangement from FIG. 6. In contrast to the previous examples, a p-channel IGBT is now used as the low-side transistor $M_2$. The circuit arrangement for supplying voltage to the transistor driver circuit 13 is identical to the circuit arrangement from FIG. 6. However, in contrast to the example shown in FIG. 6, the driver 16 for the low-side transistor and the upstream third charge pump CP3 may be dispensed with since, in the present case, the driver circuit 13 can generate the driver signals for both transistors $M_1$ and $M_2$. For this purpose, the driver circuit 13 must be supplied in a bipolar manner. Analogously to the example shown in FIG. 6, a bidirectional charge pump CP1 is needed for this purpose. A switched-on duration of any desired length becomes possible for both IGBTs of the half-bridge $M_1$, $M_2$ by virtue of the two supply voltages for the driver circuit 13 being coupled via the bidirectional charge pump CP1.

With the above range of variations and applications in mind, it should be understood that the present invention is not limited by the foregoing description, nor is it limited by the accompanying drawings. Instead, the present invention is limited only by the following claims and their legal equivalents.

The invention claimed is:

1. A circuit arrangement for providing a voltage supply for a driver circuit for driving a semiconductor switch, the circuit arrangement comprising:
   a first bootstrap circuit which is supplied with a first auxiliary voltage referring to a lower supply potential, the first bootstrap circuit comprising a first capacitor that provides a supply voltage for the driver circuit,
   a first charge pump that is configured to keep the charge in the first capacitor at or above a particular level at least during a particular period of time,
   a second bootstrap circuit that is supplied with a second auxiliary voltage referring to an upper supply potential, the second bootstrap circuit comprising a second capacitor which provides a supply voltage for the first charge pump, and
   a second charge pump which is designed to generate the second auxiliary voltage.

2. The circuit arrangement as claimed in claim 1, in which the first bootstrap circuit has a first diode whose anode is supplied with the first auxiliary voltage based on the lower supply potential and whose cathode is connected to the first capacitor.

3. The circuit arrangement as claimed in claim 1, in which the second bootstrap circuit has a second diode whose cathode is supplied with the second auxiliary voltage based on the upper supply potential and whose anode is connected to the second capacitor.

4. The circuit arrangement as claimed in claim 1, said circuit arrangement additionally comprising:
   a first circuit node which is supplied with the lower supply potential,
   a second circuit node which is supplied with the upper supply potential,
   a third circuit node which is supplied with the first auxiliary voltage based on the lower supply potential,
   a fourth circuit node at which the second auxiliary voltage based on the upper supply potential is provided,
   the second charge pump being connected to the four circuit nodes and being designed to generate the second auxiliary voltage from the first auxiliary voltage.

5. The circuit arrangement as claimed in claim 4, which comprises a fifth circuit node for connection to an output connection of the semiconductor switch, the first capacitor and the second capacitor being connected to the fifth circuit node.

6. The circuit arrangement as claimed in claim 5, in which the fifth circuit node is connected to the third circuit node by means of a series circuit comprising the first capacitor and a first diode.

7. The circuit arrangement as claimed in claim 5, in which the fifth circuit node is connected to the fourth circuit node by means of a series circuit comprising the second capacitor and a second diode.

8. The circuit arrangement as claimed in claim 1, in which the first charge pump is designed to transfer charge from the second capacitor to the first capacitor.

9. The circuit arrangement as claimed in claim 8, in which the first charge pump operates in a unidirectional manner and supplies the driver circuit in a unipolar manner.

10. The circuit arrangement as claimed in claim 8, in which the first charge pump operates in a bidirectional manner and supplies the driver circuit in a bipolar manner.

11. The circuit arrangement as claimed in claim 1, in which the driver circuit is designed to drive an n-channel high-side transistor.

12. The circuit arrangement as claimed in claim 1, in which the driver circuit is suitable for driving a half-bridge comprising an n-channel high-side transistor and a p-channel low-side transistor.

13. A circuit arrangement for providing a voltage supply for a driver circuit for driving a semiconductor switch, the circuit arrangement comprising:
   a first bootstrap circuit which is supplied with a first auxiliary voltage referring to a lower supply potential, the first bootstrap circuit comprising a first capacitor that provides a supply voltage for the driver circuit,
   a first charge pump that is configured to keep the charge in the first capacitor at or above a particular level at least during a particular period of time,
   a second bootstrap circuit that is supplied with a second auxiliary voltage referring to an upper supply potential, the second bootstrap circuit comprising a second capacitor which provides a supply voltage for the first charge pump,
   a second charge pump which is designed to generate the second auxiliary voltage, a first circuit node which is supplied with the lower supply potential, a second circuit node which is supplied with the upper supply potential, a third circuit node which is supplied with the first auxiliary voltage based on the lower supply potential, a fourth circuit node at which the second auxiliary voltage based on the upper supply potential is provided, a fifth circuit node for connection to an output connection of the semiconductor switch, the second capacitor being connected to the fifth circuit node, the fifth circuit node being connected to the fourth circuit node by means of a series circuit comprising the second capacitor and a second diode, and wherein the second charge pump is connected to the fourth circuit node and is designed to generate the second auxiliary voltage from the first auxiliary voltage.

14. A circuit arrangement for providing a voltage supply for a driver circuit for driving a semiconductor switch, the circuit arrangement comprising:

a first bootstrap circuit which is supplied with a first auxiliary voltage referring to a lower supply potential, the first bootstrap circuit comprising a first capacitor that provides a supply voltage for the driver circuit, a first charge pump that is configured to keep the charge in the first capacitor at or above a particular level at least during a particular period of time, a second bootstrap circuit that is supplied with a second auxiliary voltage referring to an upper supply potential, the second bootstrap circuit comprising a second capacitor which provides a supply voltage for the first charge pump, and a second charge pump which is designed to generate the second auxiliary voltage, wherein the first charge pump is designed to transfer charge from the second capacitor to the first capacitor and the first charge pump is configured to operate in a bidirectional manner and supply the driver circuit.

* * * * *

UNITED STATES PATENT AND TRADEMARK OFFICE
CERTIFICATE OF CORRECTION

| | | |
|---|---|---|
| PATENT NO. | : 7,944,250 B2 | Page 1 of 1 |
| APPLICATION NO. | : 12/334999 | |
| DATED | : May 17, 2011 | |
| INVENTOR(S) | : Uwe Jansen | |

It is certified that error appears in the above-identified patent and that said Letters Patent is hereby corrected as shown below:

Title page; add the following item:

(30)   Foreign Application Priority Data
Dec. 21, 2007 (DE) ............................102007061978

Signed and Sealed this
Tenth Day of July, 2012

David J. Kappos
*Director of the United States Patent and Trademark Office*